US006887518B2

(12) United States Patent
Barthel et al.

(10) Patent No.: US 6,887,518 B2
(45) Date of Patent: May 3, 2005

(54) SILICA WITH HOMOGENEOUS LAYER OF SILYLATING AGENT

(75) Inventors: Herbert Barthel, Emmerting (DE); Mario Heinemann, Burghausen (DE); August Altenbuchner, St. Radegund (AT)

(73) Assignee: Wacker-Chemie GmbH, Munich (DE)

( * ) Notice: Subject to any disclaimer, the term of this patent is extended or adjusted under 35 U.S.C. 154(b) by 114 days.

(21) Appl. No.: 10/261,575

(22) Filed: Oct. 1, 2002

(65) Prior Publication Data

US 2003/0100631 A1 May 29, 2003

(30) Foreign Application Priority Data

Oct. 12, 2001 (DE) ......................................... 101 50 274

(51) Int. Cl.[7] ................................................. B32B 5/16
(52) U.S. Cl. ...................... 427/219; 427/220; 427/444; 428/32.5; 428/405
(58) Field of Search ................................ 427/219, 220, 427/444; 428/405, 32.5, 403, 407

(56) References Cited

U.S. PATENT DOCUMENTS

| 5,352,491 | A | * | 10/1994 | Cifuentes et al. | ............ | 427/387 |
| 5,795,690 | A | * | 8/1998 | Takegawa et al. | ........ | 430/58.25 |
| 5,807,501 | A | * | 9/1998 | Burns et al. | .................. | 516/77 |
| 5,851,715 | A | * | 12/1998 | Barthel et al. | ............ | 430/108.3 |
| 5,908,660 | A | * | 6/1999 | Griffith et al. | .............. | 427/220 |
| 6,025,077 | A | * | 2/2000 | Yamaki et al. | .............. | 428/447 |
| 6,063,863 | A | * | 5/2000 | Yu et al. | ..................... | 524/838 |
| 6,184,408 | B1 | * | 2/2001 | Burns et al. | ................ | 556/450 |
| 6,534,044 | B1 | * | 3/2003 | Wada et al. | ................... | 424/59 |
| 2002/0168524 | A1 | | 11/2002 | Kerner et al. | | |

FOREIGN PATENT DOCUMENTS

| EP | 0 686 676 A1 | 12/1995 |
| EP | 0 860 478 A1 | 8/1998 |
| EP | 1 204 006 A1 | 5/2002 |
| EP | 1 236 773 A2 | 9/2002 |

OTHER PUBLICATIONS

English Derwent Abstract AN 1996–021221 [3] Corresponding To EP 0 686 676 A1.

* cited by examiner

*Primary Examiner*—H. Thi Le
(74) *Attorney, Agent, or Firm*—Brooks Kushman P.C.

(57) ABSTRACT

Silylated silica is prepared by silylating silica with an organosiloxane composed of A units of the formula (I)

$$(R^1{}_3SiO_{1/2}) \qquad (I)$$

and B units of the formulae (IIa–c)

$$(R^1{}_2SiO_{2/2}), \text{ and/or} \qquad (IIa)$$

$$(R^1SiO_{3/2}), \text{ and/or} \qquad (IIb)$$

$$(SiO_{4/2}) \qquad (IIc),$$

optionally having 1 or 2 attached groups —X on Si atoms, where

X is OR, R being hydrogen or a monovalent alkyl radical having 1–4 carbon atoms, halogen, or acetoxy, $R^1$ is a saturated or unsaturated, monovalent, optionally halogenated $C_{1-18}$ hydrocarbon radical the groups $\equiv$SiX or $=$SiX$_2$ optionally present in a number C, wherein A, B, and C satisfy the relationships:

$$1 \leq B \leq 100 \text{ or } 750 < B < 10\,000,$$

$$B \geq A+C,$$

and, when A+C=0, $10 \leq B \leq 100$ or $750 < B < 10\,000$. The silylated silica has a particularly homogenous coating of silylating agent.

22 Claims, No Drawings

SILICA WITH HOMOGENEOUS LAYER OF SILYLATING AGENT

BACKGROUND OF THE INVENTION

1. Field of the Invention

The invention relates to a process for preparing a silylated silica, and to the silica prepared thereby.

2. Background Art

It is known from EP 0 686 676 to Wacker Chemie to hydrophobicize silica using (1) a volatile silylating agent and (2) a liquid, relatively nonvolatile silylating agent, by adding at least one of the silylating agents in the form of a very finely divided aerosol. The advantage of this procedure is the high thickening effect of the silica produced by this process.

One disadvantage of this procedure is the complex reaction regime: it is necessary to operate with at least two different silylating agents, of which one is to be applied as a liquid and the other as vapor. This necessitates high process-related expenditures, for example requiring cost-intensive apparatus and process control. The process described in the patent achieves yields which are well below 100%.

Existing processes for coating silica with organosilicon compounds are based, according to the state of the art, on the controlled addition of silylating agent. A precondition for controlled addition is sufficient reactivity of the silylating agents. This is generally the case when the silylating agents have reactive groups on the silicon atom, such as halide radicals (Cl, Br), alkoxy radicals (OR) amino radicals (—N—R), or silazane radicals (—N—Si—). Hydrophobicizing with reactive silylating agents is a costly approach, since the abovementioned silylating agents are expensive to prepare. Secondly, as a consequence of the high reactivity of the silylating agents, they may interreact in an uncontrolled fashion during the course of the main reaction, leading to unwanted side reactions and side-reaction products. A further serious disadvantage of the above silylating agents is the emission of elimination products from the functional group, such as hydrogen halides, alcohols, amines or ammonia. This emission fosters corrosion problems and hence requires additional costs for special materials and increased cleaning operations. The emissions also create environmental pollution and/or complex waste-gas and waste-water purification operations, which are again costly.

It would be desirable to overcome the disadvantages of prior methods of treating silica, in particular, to avoid the use of highly reactive silylating agents with their associated problems and costs. It would be further desirable to provide a uniform silica product having a homogeneous layer of silylating agent.

SUMMARY OF THE INVENTION

It has now been surprisingly discovered that under the conditions of the invention, and when using silylating agents of the invention, an excellent silylation can be obtained without the emission of toxic elimination products, and without unwanted side reactions, while at the same time forming of a homogeneous layer of silylating agent.

DETAILED DESCRIPTION OF THE PREFERRED EMBODIMENT(S)

The invention provides a process for preparing a silylated silica, which comprises silylating the silica with an organosiloxane composed of A units of the formula (I)

$$(R^1{}_3SiO_{1/2}) \tag{I}$$

and B units of the formulae (IIa–c)

$$(R^1{}_2SiO_{2/2}), \text{ and/or} \tag{IIa}$$

$$(R^1SiO_{3/2}), \text{ and/or} \tag{IIb}$$

$$(SiO_{4/2}) \tag{IIc},$$

it being possible for the organosiloxane to have 1 or 2 attached groups —X on Si atoms, where X is individually selected from OR, hydrogen, halogen, or an acetoxy group, where R is hydrogen or a monovalent alkyl radical having 1–4 carbon atoms, preferably a methyl or ethyl radical, $R^1$ is a saturated or unsaturated, monovalent, optionally halogenated hydrocarbon radical having from 1 to 18 carbon atoms, and may be identical or different. When the organosiloxane contains the groups $\equiv SiX$ or $=SiX_2$, and their amount is reflected by the number C, then A, B, and C follow the relationships: $1 \leq B \leq 100$ or $750 < B < 10{,}000$, wherein in one preferred version $10 \leq B \leq 50$ and most preferably $10 \leq B \leq 20$; while in another preferred version $1000 \leq B \leq 5000$, $B \geq A+C$, preferably $B > A+C$, and most preferably $B > 2(A+C)$, and, if $A+C=0$, $10 \leq B \leq 100$ or $750 < B < 10{,}000$. Preferably, $A+C \leq 20$, and most preferably $A+C \leq 2$. Otherwise, the ratio of A to C is arbitrary.

Most preferably, at least one chain-terminal hydroxyl group is bonded to Si, i.e. a terminal silanol group $\equiv SiOH$. In another version, at least one chain-terminal trimethylsiloxy group is bonded to Si, i.e. a terminal trimethylsiloxy group $\equiv SiOSi(CH_3)_3$.

Preference is given to organosiloxanes containing more than 80 mol % of $R^1{}_2SiO_{2/2}$ units. Each $R^1$ independently is preferably a saturated or unsaturated, monovalent, optionally halogenated hydrocarbon radical having from 1 to 18 carbon atoms. Unsaturated $R^1$ include polyunsaturated hydrocarbons. The organosiloxanes are preferably liquid at the coating or "loading" temperature.

Examples of $R^1$ include alkyl radicals such as the methyl radical, the ethyl radical, propyl radicals such as the iso- and n-propyl radicals, butyl radicals such as the t- and n-butyl radicals, pentyl radicals such as the neo-, iso- and n-pentyl radicals, hexyl radicals such as the n-hexyl radical, heptyl radicals such as the n-heptyl radical, octyl radicals such as the 2-ethylhexyl and n-octyl radicals, decyl radicals such as the n-decyl radical, dodecyl radicals such as the n-dodecyl radical, hexadecyl radicals such as the n-hexadecyl radical, octadecyl radicals such as the n-octadecyl radical, alkenyl radicals such as the vinyl, the 2-allyl and the 5-hexenyl radicals, aryl radicals such as the phenyl, the biphenylyl and naphthenyl radicals, alkylaryl radicals such as the benzyl, ethylphenyl, tolyl and xylyl radicals, halogenated alkyl radicals such as the 3-chloropropyl, 3,3,3-trifluoropropyl and perfluorohexylethyl radicals, and halogenated aryl radicals such as the chlorophenyl and chlorobenzyl radicals. Preferred examples of $R^1$ are the methyl radical, the octyl radical, and the vinyl radical. The methyl radical is particularly preferred.

Examples of organosiloxanes are linear or cyclic dialkylsiloxanes having an average number of dialkylsiloxy units of more than 2, preferably more than 10. The dialkylsiloxanes are preferably dimethylsiloxanes. Examples of linear polydimethylsiloxanes are those with the following end groups: trimethylsiloxy, dimethylhydroxysiloxy, dimethylchlorosiloxy, methyldichlorosiloxy, dimethylmethoxysiloxy, methyldimethoxysiloxy, dimethylethoxysiloxy, metbyldiethoxysiloxy, dimethylacetoxysiloxy, and methyldiacetoxysiloxy. Trimethylsiloxy and dimethylhydroxysiloxy end groups are particularly preferred. The end groups may be identical or different.

In one preferred embodiment, preference among the polydimethylsiloxanes is given to those with trimethylsiloxy end groups and a viscosity at 25° C. of less than or equal to 0.15 Pa·s, corresponding to a molecular weight of about 5000 daltons or less. Particular preference is given to polydimethylsiloxanes having a viscosity of less than or equal to 0.05 Pa·s, corresponding to a molecular weight of about 1500 daltons or less.

In another preferred embodiment, preference among the polydimethylsiloxanes is given to those with the dimethylhydroxysiloxy end groups and a viscosity at 25° C. of less than 0.1 Pa·s, more preferably less than 0.05 Pa·s. Particularly preferred are polydimethylsiloxanes with dimethylhydroxysiloxy end groups and with Si hydroxyl group (silanol content of greater than 1.5% by weight, more preferably greater than 3% by weight, and most preferably greater than 4.5% by weight.

In a further preferred embodiment, preference is given to polydimethylsiloxanes with trimethylsiloxy end groups and a viscosity at 25° C. of greater than or equal to 50 Pa s corresponding to a molecular weight of about 50,000 daltons or higher, with particular preference to viscosities greater than or equal to 100 Pa s, corresponding to a molecular weight of 75,000 daltons or higher.

Preparation of the Starting Silica

The silica preferably has an average primary particle size of less than 100 nm, more preferably an average primary particle size of from 5 to 50 nm. These primary particles do not exist in isolation in the silica but instead are constituents of larger aggregates and agglomerates. The silica comprises aggregates (as defined in DIN 53206) in the range of a diameter of from 100 to 1000 nm, and agglomerates (as defined in DIN 53206) which are composed of aggregates and which depending on the external shearing load (e.g., measurement conditions) have sizes of from 1 to 500 μm).

The silica preferably has a specific surface area of from 25 to 500 m²/g (measured by the BET method in accordance with DIN 66131 and 66132).

The silica preferably has a fractal surface dimension of less than or equal to 2.3, more preferably less than or equal to 2.1, with particular preference from 1.95 to 2.05, the fractal surface dimension $D_s$ being defined as follows: particle surface A is proportional to particle radius R to the power of $D_s$. The silica preferably has a fractal mass dimension $D_m$ of less than or equal to 2.8, more preferably less than or equal to 2.7, with particular preference from 2.4 to 2.6. The fractal mass dimension $D_m$ is defined as follows: particle mass M is proportional to particle radius R to the power of $D_m$. Both the fractal surface dimension and the fractal mass dimension are well known to those skilled in the art.

The silica preferably has a surface silanol group SiOH density of less than 2.5 $SiOH/nm^2$, more preferably less than 2.1 $SiOH/nm^2$, more preferably less than 2 $SiOH/nm^2$, and most preferably from 1.7 to 1.9 $SiOH/nm^2$.

It is possible to use silicas prepared at a high temperature, i.e. more than 1000° C. Particular preference is given to silicas prepared pyrogenically. It is also possible to use hydrophilic silicas which come freshly prepared direct from the burner, which have been stored, or which have already been packaged in the commercially customary fashion. It is also possible to use hydrophobicized silicas, e.g., commercially customary silicas.

Both uncompacted silicas, with bulk densities less than 60 g/l, and compacted silicas with bulk densities more than 60 g/l, can be used.

As the base (initial) product for silylation it is preferred to use a hydrophilic pyrogenic silica prepared under anhydrous conditions. "Anhydrous" here means that neither in the hydrothermal preparation process nor in the further steps of the process, such as cooling, purification, and storage, through to the finished and purified, packaged and ready-to-dispatch product, is any additional water supplied to the process, either in liquid form or in vapor form. In any case, not more than 5% by weight of water, based on the overall weight of the silica, is added, preferably as little water as possible, and with particular preference no water at all.

It is possible to use mixtures of different silicas: for example, mixtures of silicas differing in BET surface area or mixtures of silicas differing in degree of hydrophobicization or degree of silylation.

As silylating agents for preparing the silylated silica, the organosiloxanes described previously may be used. Preferably, more than 1.5% by weight of silylating agent, more preferably more than 3% by weight, more than 5% by weight, and most preferably more than 10% by weight of silylating agent per 100 m²/g BET Silica surface area (measured by the BET method in accordance with DIN 66131 and 66132) is employed. The silylation may be conducted as a discontinuous reaction, i.e., batchwise, or as a continuous reaction. For technical reasons, a continuous reaction is preferred. The reaction may be accomplished in one step, or in 2 or 3 successive steps. In other words, the reaction may be preceded by loading, (physisorption of the silylating agent) and followed by a purification step. Preference is given to 3 successive steps: loading, reaction, and purification.

The loading temperature is preferably from −30° C. to 350° C., more preferably from 20° C. to 300° C., and most preferably 20° C. to 120° C. The reaction temperatures preferably range from 200 to 400° C., more preferably from 250° C. to 350° C., and most preferably from 280 to 330° C., over the reaction times which preferably extend to from 1 min to 24 h, more preferably from 10 min to 8 h, and most preferably from 30 min to 4 h. The reaction pressure is preferably in the range of atmospheric pressure, although an overpressure of up to 10 bar or an underpressure of as little as 0.2 bar are also possible. The purification temperature preferably ranges from 100 to 400° C., more preferably from 250° C. to 350° C., and most preferably from 290 to 340° C.

Effective agitation and mixing of Silica and silylating agent is necessary, preferably by means of mechanical or gasborne fluidization. Gasborne fluidization may be effected by any inert gases which do not react with the silylating agent, the silica, the silylated silica, or side-reaction products. In other words, the choice of gas should be such that side reactions, degradation reactions, oxidation events, and flame or explosion phenomena are avoided. Suitable gases include $N_2$, Ar, other noble gases, $CO_2$, etc. The fluidizing gases are supplied preferably at superficial gas velocities of from 0.05 to 5 cm/s, with particular preference from 0.05 to 1 cm/s. Mechanical fluidization can be accomplished by means of paddle stirrers, anchor stirrers, and other suitable stirring elements.

The reaction is preferably conducted in an atmosphere which does not lead to oxidation of the silylated silica, i.e., a low-oxygen atmosphere, preferably containing less than 10% by volume oxygen, more preferably less than 2.5% by volume, best results being achieved at less than 1% by volume oxygen. In one particularly preferred embodiment, only the amount of gas sufficient to maintain a low-oxygen atmosphere is supplied, with fluidization being accomplished by purely mechanical means.

The silylating agents should be introduced effectively into the Silica. Since the silylating agents are compounds which are generally liquid at room temperature and/or reaction temperature, it is preferred to employ effective atomizing techniques: atomization in 1-fluid nozzles under pressure (from 5 to 20 bar), spraying in 2-fluid nozzles under pressure (gas and liquid, 2–20 bar), ultrafine division with atomizers, etc., may be used.

The silylating agent is preferably added in the form of a very finely divided aerosol, characterized in that the aerosol preferably has a settling velocity of 0.1–20 cm/s.

Optionally, protic solvents, such as liquid or vaporizable alcohols or water may be added. Typical alcohols are isopropanol, ethanol, and methanol. It is also possible to add mixtures of the abovementioned protic solvents. Preferably, no protic solvents are added.

It is also optional to add acidic or basic catalysts, for example those derived from waste products of purification and/or side-reactions, which may be basic in nature in the sense of a Lewis base or a Brönsted base such as ammonia, or acidic in nature in the sense of a Lewis acid or a Brönsted acid such as hydrogen chloride. Such catalysts are preferably added in traces, i.e. less than 1000 ppm. It is particularly preferred not to add any catalysts.

The purification step is characterized by agitation, with preference being given to slow agitation and slight mixing, and is further characterized by an increased gas input, corresponding to a superficial gas velocity of from 0.001 to 10 cm/s, preferably from 0.01 to 1 cm/s. Additionally, the purification step may involve further mixing with mechanical stirring elements. The stirring elements are preferably positioned and agitated in such a way that mixing and fluidization occur, but not complete vortexing.

It is also possible to employ methods for mechanical compaction during the silylating step, for example, press rollers, ball mills, edge runner mills, screw compactors, or briquetting machines. It is also possible during the silylating step to employ processes for deagglomeration of the silica, such as the use of pinned-disk mills or milling/classifying devices.

It is additionally possible following the purification processes to employ processes for the mechanical compaction of the silica, such as, for example, press rolls, or compaction by withdrawal of the air or gas present under suction by means of suitable vacuum methods, or other processes for mechanical compaction, such as press rolls, ball mills, edge runner mills, screw compactors, or briquetting machines. It is also possible to employ processes for deagglomeration of the silica following purification, such as pinned-disk mills or milling/classifying devices.

In a preferred embodiment, the unreacted silylating agents, side-reaction products, silylating agent excesses which have not been chemically fixed and which may have been modified, waste products of purification, and waste gases from the purification step in suitable temperature-conditioned devices are passed back into the step of coating and loading of the silica; this may be done in whole or in part, preferably to the extent of 50–90% of the overall volume flow of the gas volumes emerging from the purification.

The subject invention further provides a silica which has a homogeneous layer of silylating agent on the silica surface, hydrophobic properties, preferably an average primary particle size of less than 100 nm, more preferably from 5 to 50 nm, and most preferably from 5 to 20 nm, these primary particles not generally existing in isolation in the silica but instead being constituents of larger aggregates (as defined in DIN 53206) which preferably have a diameter of from 100 to 1000 nm, more preferably from 100 to 500 nm, and make up agglomerates (as defined in DIN 53206) which, depending on the external shearing load, preferably have sizes of from 1 to 500 μm, preferably a specific surface area of from 10 to 300 m$^2$/g, more preferably from 50 to 250 m$^2$/g, and most preferably from 100 to 200 m$^2$/g (measured by the BET method in accordance with DIN 66131 and 66132), preferably have a fractal mass dimension $D_m$ of less than or equal to 2.8, more preferably from 2.5 to 2.7, and preferably a carbon content of at least 1.0% by weight, more preferably 3.0% by weight, and most preferably 4.5% by weight, based on the total weight of the silica.

The silica of the invention has substantially no wettable fractions on contact with water, and exhibits apolarity, measured by adsorption of methyl red (see below). In accordance with these characteristics, the silica of the invention can be termed apolar.

One particular feature of the silica of the invention is that its surface is chemically homogeneous and that the silylating agent radicals and unreacted silanol groups, on a molecular scale as well, have a homogeneously uniform distribution. This can be demonstrated by means of wetting tests, as disclosed below.

The chain length of the silylating agent radicals attached to the silica is preferably less than 10 alkylsiloxy units, more preferably less than 5 alkylsiloxy units per monofunctionally attached radical; or less than 20 alkylsiloxy units, preferably less than 10 alkylsiloxy units per difunctionally attached radical. This can be demonstrated by T2 relaxation methods of $^1$H solid-state NMR.

In one preferred embodiment the silica of the invention possesses a completely chemically attached silylating agent layer (i.e., less than 0.5% by weight of the organosilicon silylating agent layer is extractable with tetrahydrofuran at a temperature of 25° C. The extracted organosilicon compounds are advantageously detected by means of atomic absorption spectrometry.

The silica of the invention is further characterized in that it has a high thickening action in polar systems such as solutions, suspensions, emulsions, and dispersions of organic resins in water, and also with polar polymers and resins such as polyesters, vinyl esters, epoxy resins, polyurethanes, acrylates, etc. in apolar solvents such as monostyrene, and is therefore suitable as a rheological additive in these systems.

The silica of the invention is further characterized in that it has a low thickening action in apolar systems, such as noncrosslinked silicone rubber, while at the same time exhibiting a high reinforcing effect in the crosslinked silicone rubbers, and is therefore outstandingly suitable as a reinforcing filler in these applications.

The silica of the invention is further characterized in that in pulverulent systems it shows no tendency toward caking under the influence of moisture, nor toward reagglomeration, and hence toward separation, and therefore permits loading-stable and storage-stable mixtures of the silica with powder. This applies in particular to its use in nonmagnetic and magnetic toners and developers, which may be 1-component or 2-component systems, and to its use in coating systems which are applied in powder form, such as powder paints and powder coating materials.

Advantages of the process of the present invention include:

1) High reaction yields, hence being economical and sparing of resource;
2) No side reactions, and thus a uniform and homogeneous silylating agent layer.

3) No elimination products such as hydrogen halides, alcohols or amines/ammonia from the silylating agent, hence being environmentally benign and cost-effective, in particular since expensive downstream purification operations are unnecessary; and 4) Inexpensive silylating agents.

The invention further provides an additive for controlling the rheology of liquid and pulverulent systems which comprises the silica of the invention. The invention further relates in general to the use of the silica of the invention, in which context it is used as an additive for controlling the rheology of liquid and pulverulent systems, especially in all solvent-free, solvent-borne, water-thinnable, film-forming coating compositions, rubberlike to hard coatings, adhesives, sealing compounds and casting compounds, and in other comparable systems. The invention is applicable to all systems of low to high polarity which comprise silica as a viscosity-imparting component. It relates in particular to systems such as:

epoxy systems,
polyurethane (PU) systems,
vinyl ester resins,
unsaturated polyester resins,
water-soluble or water-dispersible resin systems,
low-solvent, high-solids, resin systems, and
solvent-free resins which are applied in powder form, for example, as coating materials.

As an additive for controlling the rheology in these systems the silica of the invention provides the necessary viscosity, pseudoplasticity, and thixotropy needed and, for the ability to stand on vertical surfaces, a sufficient yield point; additionally, polymeric additives preferably with a molecular weight of from 100 to 2000 may also be present, such as polyethylene glycols, polyethers, polyamides, alkyl-substituted sorbitols.

The invention additionally provides a filler for reinforcing elastomers which comprises a silica of the invention. The invention further relates to the use of the silica of the invention as a rheological additive and filler for reinforcing elastomers, preferably in noncrosslinked and crosslinked silicone systems, such as in the case of silicone elastomers, which are composed of silicone polymers, such as polydimethylsiloxanes, fillers, and further additives; these may be crosslinked, for example, using peroxides, or by way of addition reactions, for example, the reaction between olefinic groups and Si—H groups, known as hydrosilylation, or by way of condensation reactions between silanol groups. The additive for reinforcing elastomers may also comprise quartz flour.

Also provided is a toner or developer comprising a silica. The invention further relates to the use of the silica of the invention in developers and toners, e.g., magnetic 1-component and 2-component toners, and also nonmagnetic toners. These toners may be composed of resins such as polyester resins, styrene resins, and acrylic resins or blends thereof, preferably ground to particle distributions of 1–100 µm, or may be resins which are prepared in polymerization processes in dispersions or emulsions or solutions or without solvent to give particle distributions of preferably 1–100 µm. The silica is preferably employed for improving and controlling the powder flow properties and/or for regulating and controlling the triboelectric charging properties of the toner or developer. Toners and developers of this kind can be used preferentially in all nonimpact printing processes, such as electrophotographic printing processes. Furthermore, they may also be used in the context of direct image transfer processes.

Preparation of the Silica of the Invention

EXAMPLE 1

In a continuous apparatus at a temperature of 25° C. and under $N_2$ inert gas, 150 g/h trimethylsiloxy-terminated PDMS (viscosity: 100,000 mPa·s at 25° C.) (Silicone oil AK 100 000 from Wacker Chemie GmbH) in solution in tetrahydrofuran solvent in a weight proportion of 1 to 10 are added in liquid, very finely divided form by atomization through a single-fluid nozzle (pressure 20 bar) to a mass flow of 1000 g/h hydrophilic silica having a moisture content <1% by weight and an HCl content <100 ppm, and having a specific surface area of 300 $m^2/g$ (measured by the BET method in accordance with DIN 66131 and 66132) (WACKER HDK T30 from Wacker-Chemie GmbH, Burghausen, Germany). The silica thus loaded is freed from the THF solvent at 100° C. for 3 hours and then reacted at a temperature of 300° C. with a residence time of 2 hours. It is then purified with mechanical stirring and gassing with $N_2$ at <0.5 cm/s gas velocity at a temperature of 150° C. for 30 minutes. This gives a white, hydrophobic silica powder having an excellent degree of silylation and a homogeneous silylating agent layer. Data in Table 1.

EXAMPLE 2

In a discontinuous apparatus at a temperature of 25° C. and under $N_2$ inert gas, 50 g of trimethylsiloxy-terminal PDMS (viscosity: 100,000 mPa s at 25° C.) (Silicone oil AK 100 000 from Wacker Chemie GmbH) in solution in tetrahydrofuran solvent in a weight proportion of Silicone oil to THF of 1 to 10 are added in liquid, very finely divided form by atomization through a single-fluid nozzle (pressure 20 bar) in a number of steps to 100 g of hydrophilic silica having a moisture content <1% by weight and an HCl content <100 ppm and having a specific surface area of 300 $m^2/g$ (measured by the BET method in accordance with DIN 66131 and 66132) (WACKER HDK T30 from Wacker-Chemie GmbH, Burghausen, Germany). The silica thus loaded is freed from the THF solvent at 100° C. for 3 hours and then reacted in a reactor at a temperature of 300° C. with a residence time of 2 hours, with the supply of $N_2$ under 15-fold gas exchange during the reaction time. This gives a white, hydrophobic silica powder having an excellent degree of silylation. Data in Table 1.

EXAMPLE 3

In a discontinuous apparatus at a temperature of 25° C. and under $N_2$ inert gas, 30 g of trimethylsiloxy-terminal PDMS (viscosity: 1,000,000 mPa·s at 25° C.) (Silicone oil AK 1 000 000 from Wacker Chemie GmbH) in solution in tetrahydrofuran solvent in a proportion of Silicone oil to THF of 1 to 20 are added in liquid, very finely divided form by atomization through a single-fluid nozzle (pressure 20 bar) in steps to 100 g of hydrophilic silica having a moisture content <1% by weight and an HCl content <100 ppm and having a specific surface area of 300 $m^2/g$ (measured by the BET method in accordance with DIN 66131 and 66132) (WACKER HDK T30 from Wacker-Chemie GmbH, Burghausen, Germany). The silica thus loaded is freed from the THF solvent at 100° C. for a total of 4 hours and then reacted in a reactor at a temperature of 300° C. with a residence time of 2 hours, with the supply of $N_2$ under 15-fold gas exchange during the reaction time. This gives a white, hydrophobic silica powder having an excellent degree of silylation. Data in Table 1.

COMPARATIVE EXAMPLE C1

In a discontinuous apparatus at a temperature of 25° C. and under $N_2$ inert gas, 50 g of trimethylsiloxy-terminal PDMS (viscosity: 1000 mPa s at 25° C.) (Silicone oil AK 1000 from Wacker Chemie GmbH) in solution in tetrahydrofuran solvent in a weight proportion of Silicone oil to THF of 1 to 3 are added in liquid, very finely divided form by atomization through a single-fluid nozzle (pressure 20 bar) in steps to 100 g of hydrophilic silica having a moisture content <1% by weight and an HCl content <100 ppm and having a specific surface area of 300 m$^2$/g (measured by the BET method in accordance with DIN 66131 and 66132) (WACKER HDK T30 from Wacker-Chemie GmbH, Burghausen, Germany). The silica thus loaded is freed from the THF solvent at 100° C. for 3 hours and then reacted in a N$_2$-blanketed reactor at a temperature of 300° C. with a residence time of 2 hours, with the supply of N$_2$ under 15-fold gas exchange during the reaction time. This gives a white, poorly hydrophobic silica powder having only a moderate degree of silylation. Data in Table 1.

COMPARATIVE EXAMPLE C2

In a discontinuous apparatus at a temperature of 25° C. and under N$_2$ inert gas 15 g of octamethylcyclotetrasiloxane are added in liquid, very finely divided form by atomization through a single-fluid nozzle (pressure 20 bar) in steps to 100 g of hydrophilic silica having a moisture content <1% by weight and an HCl content <100 ppm and having a specific surface area of 200 m$^2$/g (measured by the BET method in accordance with DIN 66131 and 66132) (WACKER HDK N20 from Wacker-Chemie GmbH, Burghausen, Germany). The silica thus loaded is reacted in a N$_2$-blanketed reactor at a temperature of 300° C. with a residence time of 2 hours. This gives a white, poorly hydrophobic silica powder having only a moderate degree of silylation. Data in Table 1.

EXAMPLE 4

In a continuous apparatus at a temperature of 120° C. and under N$_2$ inert gas, 200 g/h hydroxyl-terminal PDMS (average chain length 14 DMS units, viscosity: 40 mPa·s at 25° C.) are added in liquid, very finely divided form by atomization through a single-fluid nozzle (pressure 10 bar) to a mass flow of 1000 g/h hydrophilic silica having a moisture content <1% by weight and an HCl content <100 ppm and having a specific surface area of 300 m$^2$/g (measured by the BET method in accordance with DIN 66131 and 66132) (WACKER HDK T30 from Wacker-Chemie GmbH, Burghausen, Germany). The silica thus loaded is subsequently reacted at a temperature of 300° C. with a residence time of 2 hours. It is then purified with mechanical stirring and gassing with N$_2$ at <0.5 cm/s gas velocity at a temperature of 150° C. for 30 minutes. This gives a white, hydrophobic silica powder having an excellent degree of silylation. Data in Table 1.

EXAMPLE 5

In a continuous apparatus at a temperature of 120° C. and under N$_2$ inert gas, 150 g/h hydroxyl-terminal PDMS (average chain length 14 DMS units, viscosity: 40 mPa·s at 25° C.) are added in liquid, very finely divided form by atomization through a single-fluid nozzle (pressure 10 bar) to a mass flow of 1000 g/h hydrophilic silica having a moisture content <1% by weight and an HCl content <100 ppm and having a specific surface area of 200 m$^2$/g (measured by the BET method in accordance with DIN 66131 and 66132) (WACKER HDK N20 from Wacker-Chemie GmbH, Burghausen, Germany). The silica thus loaded is subsequently reacted at a temperature of 300° C. with a residence time of 2 hours. It is then purified with mechanical stirring and gassing with N$_2$ at <0.5 cm/s gas velocity at a temperature of 150° C. for 30 minutes. This gives a white, hydrophobic silica powder having an excellent degree of silylation. Data in Table 1.

COMPARATIVE EXAMPLE C3

In a continuous apparatus at a temperature of 120° C. and under N$_2$ inert gas, 150 g/h hydroxyl-terminal PDMS (average chain length 14 DMS units, viscosity: 40 mPa·s at 25° C.) are added in liquid, very finely divided form by atomization through a single-fluid nozzle (pressure 10 bar) to a mass flow of 1000 g/h hydrophilic silica having a moisture content <1% by weight and an HCl content <100 ppm and having a specific surface area of 200 m$^2$/g (measured by the BET method in accordance with DIN 66131 and 66132) (obtainable under the name WACKER HDK N20 from Wacker-Chemie GmbH, Burghausen, Germany). The silica thus loaded is subsequently reacted at a temperature of 100° C. with a residence time of 2 hours. It is then purified with mechanical stirring and gassing with N$_2$ at <0.5 cm/s gas velocity at a temperature of 150° C. for 30 minutes. This gives a white, only moderately hydrophobic silica powder having a low degree of silylation. Data in Table 1.

EXAMPLE 6

In a continuous apparatus at a temperature of 120° C. and under N$_2$ inert gas, 60 g/h hydroxyl-terminal PDMS (average chain length 15 DMS units, viscosity: 40 mPa·s at 25° C.) are added in liquid, very finely divided form by atomization through one single-fluid nozzle in each case (pressure 10 bar) to a mass flow of 1000 g/h hydrophilic silica having a moisture content <1% by weight and an HCl content <100 ppm and having a specific surface area of 125 m$^2$/g (measured by the BET method in accordance with DIN 66131 and 66132) (WACKER HDK S13 from Wacker-Chemie GmbH, Burghausen, Germany). The silica thus loaded is subsequently reacted at a temperature of 300° C. with a residence time of 2 hours. It is then purified with mechanical stirring and gassing with N$_2$ at <0.5 cm/s gas velocity at a temperature of 150° C. for 30 minutes. This gives a white, hydrophobic silica powder having an excellent degree of silylation. Data in Table 1.

EXAMPLE 7

In a continuous apparatus at a temperature of 120° C. and under N$_2$ inert gas, 30 g/h hydroxyl-terminal PDMS (average chain length 15 DMS units, viscosity: 40 mPa s at 25° C.) are added in liquid, very finely divided form by atomization through one single-fluid nozzle in each case (pressure 10 bar) to a mass flow of 1000 g/h hydrophilic silica having a moisture content <1% by weight and an HCl content <100 ppm and having a specific surface area of 50 m$^2$/g (measured by the BET method in accordance with DIN 66131 and 66132) (WACKER HDK D05 from Wacker-Chemie GmbH, Burghausen, Germany). The silica thus loaded is subsequently reacted at a temperature of 300° C. with a residence time of 2 hours. It is then purified with mechanical stirring and gassing with N$_2$ at <0.5 cm/s gas velocity at a temperature of 150° C. for 30 minutes. This gives a white, hydrophobic silica powder having an excellent degree of silylation. Data in Table 1.

EXAMPLE 8

In a continuous apparatus at a temperature of 300° C. and under N$_2$ inert gas, 150 g/h hydroxyl-terminal PDMS (average chain length 14 DMS units, viscosity: 40 mPa·s at 25° C.) are added in liquid, very finely divided form by atomization through a single-fluid nozzle (pressure 10 bar) to a mass flow of 1000 g/h hydrophilic silica having a moisture content <1% by weight and an HCl content <100 ppm and having a specific surface area of 200 m²/g (measured by the BET method in accordance with DIN 66131 and 66132) (WACKER HDK N20 from Wacker-Chemie GmbH, Burghausen, Germany). The silica thus loaded is subsequently reacted at a temperature of 300° C. with a residence time of 2 hours. It is then purified with mechanical stirring and gassing with $N_2$ at <0.5 cm/s gas velocity at a temperature of 150° C. for 30 minutes. This gives a white, hydrophobic silica powder having an excellent degree of silylation. Data in Table 1.

EXAMPLE 9

In a continuous apparatus at a temperature of 120° C. and under $N_2$ inert gas, 150 g/h trimethylsiloxy-terminal PDMS (average chain length 40 DMS units, viscosity: 20 mPa·s at 25° C., available from Wacker Chemie GmbH under the name AK 20) are added in liquid, very finely divided form by atomization through a single-fluid nozzle (pressure 10 bar) to a mass flow of 1000 g/h hydrophilic silica having a moisture content <1% by weight and an HCl content <100 ppm and having a specific surface area of 200 m²/g (measured by the BET method in accordance with DIN 66131 and 66132) (WACKER HDK N20 from Wacker-Chemie GmbH, Burghausen, Germany). The silica thus loaded is subsequently reacted at a temperature of 300° C. with a residence time of 2 hours. It is then purified with mechanical stirring and gassing with $N_2$ at <0.5 cm/s gas velocity at a temperature of 150° C. for 30 minutes. This gives a white, hydrophobic silica powder having an excellent degree of silylation. Data in Table 1.

Table 1

Characteristic data describing the achieved hydrophobicization of the silica are summarized in Table 1: carbon content (% C) as a measure of the coverage with silylating agent, reaction yield (%) (calculated from the expected and found carbon content), residual content of unsilylated silica silanol groups, test (yes/no) of wettability with water (WT), methanol number (MN), intensity of the band for isolated OH stretching vibration at 3750 cm⁻¹, measured by DRIFT (diffuse reflectance infrared Fourier transform spectroscopy), polarity, measured via solvatochromism with methyl red in toluene (MRN), homogeneity of the structure of the silylating agent layer on the silica surface, measured by solid-state ¹H-NMR (T2 relaxation) (fraction of freely movable, mobile silylating agent: % mobile).

TABLE 1

| Example | % C | % yield | % SiOH residue | WT | MN | DRIFT 3750 1/cm | MRN | % mobile |
|---|---|---|---|---|---|---|---|---|
| 1 | 4 | 95 | 14 | no | 70 | 0 | 5 | <10% |
| 2 | 10.5 | 97 | 7 | no | 70 | 0 | 5 | <10% |
| 3 | 7 | 94 | 8 | no | 75 | 0 | 5 | <10% |
| C1 | 7.1 | 66 | 33 | partial | 50 | 10 | 4 | >30% |
| C2 | 2.4 | 56 | 42 | partial | 50 | 15 | 3 | >30% |
| 4 | 5.1 | 94 | 12 | no | 75 | 0 | 5 | <10% |
| 5 | 4.1 | 98 | 11 | no | 70 | 0 | 5 | <10% |
| C3 | 3 | 72 | 39 | partial | 50 | 20 | 3 | >30% |
| 6 | 1.8 | 97 | 12 | no | 70 | 0 | 5 | <10% |
| 7 | 0.9 | 99 | 13 | no | 70 | 0 | 5 | <10% |
| 8 | 3.9 | 92 | 10 | no | 75 | 0 | 5 | <10% |
| 9 | 4.1 | 96 | 14 | no | 70 | 0 | 5 | <10% |

Description of the Analytical Methods

1. Carbon content (% C):
   Elemental analysis for carbon; combustion of the sample at >1000° C. in an $O_2$ stream, detection and quantification of the resulting $CO_2$ with IR; instrument LECO 244.
2. Reaction yield (%):
   calculated from the expected theoretical carbon content % C-theor and the experimentally found carbon content % C-exp: % yield=% C-exp/% C-theor*100%
3. Residual content of unsilylated silica silanol groups:
   Method: acid-base titration of the silica suspended in 50:50 water/methanol; titration in the range lying above the pH range of the isoelectric point and below the pH range of the dissolution of the silica
   untreated silica with 100% SiOH (silica surface silanol groups):
   SiOH-phil=2 SiOH/nm²
   silylated silica: SiOH-silyl
   residue silica silanol content: % SiOH=SiOH-silyl/SiOH-phil*100%.
4. Test (yes/no) of wettability with water (WT):
   Tipping-in of an equal volume of silica with an equal volume of water;
   in the case of wetting (hydrophilic), silica sinks: YES,
   in the case of nonwetting (hydrophobic), silica floats: NO.
5. Test (volume % MeOH in water) of wettability with water/methanol mixtures=methanol number (MN): tipping of an equal volume of the silica with an equal volume of water/methanol mixture start with 0% methanol;
   in the case of nonwetting, silica floats: use mixture with an MeOH content 5% by volume higher.
   in the case of wetting, silica sinks: fraction of MeOH (%) in water gives MN.
6. Intensity of the band for isolated OH stretching vibration at 3750 cm−1, measured by DRIFT (diffuse reflectance infrared Fourier transformation spectroscopy) relative to the intensity of the band of the untreated silica: % SiOH-3750 1/cm=intensity-silylated (SiOH-3750 1/cm)/intensity-hydrophilic (SiOH-3750 1/cm) *100%.

7. Polarity, measured via solvatochromism with methyl red in toluene (MRN)
dissolution of 20 mg of methyl red in toluene; suspension of 0.5 g of silica in 10 ml of toluenic methyl red solution; visual assessment of the color of the suspension:

| | | |
|---|---|---|
| violet | 0 | untreated silica |
| reddish violet | 1 | |
| red | 2 | |
| reddish orange | 3 | |
| orange | 4 | |
| yellowish orange | 5 | fully silylated silica. |

8. Homogeneity of the structure of the silylating agent layer on the silica surface, measured by solid-state 1H-NMR (T2 relaxation) (fraction of freely movable, mobile silylating agent % mobile) determination of the movable (mobile) and adsorbed-immovable (immobile) fractions of the silylating agent on the silica surface, determined by way of the T2 relaxation of the protons.

% mobile=mobile fraction/(immobile fraction+mobile fraction)*100%.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention. The terms "a" and "an" mean "one or more than one" unless indicated to the contrary.

What is claimed is:

1. A process for preparing silylated silica particles, comprising silylating silica particles with an organosiloxane composed of A units of the formula (I)

$(R^1_3SiO_{1/2})$ (I)

and B units of the formulae (IIa–c)

$(R^1_2SiO_{2/2})$, and/or (IIa)

$(R^1SiO_{3/2})$, and/or (IIb)

$(SiO_{4/2})$ (IIc), said organosiloxane optionally bearing 1 or 2 attached groups X bonded to Si atoms where X is OR halogen, or acetoxy, where R is H or a monovalent $C_{1-4}$ alkyl radical,
$R^1$ is identical or different a saturated or unsaturated, monovalent, or halogenated $C_{1-18}$ hydrocarbon radical,
the number of groups $\equiv SiX$ or $=SiX_2$ present in said organosiloxane defined as C, wherein A, B, and C obey the relationships $1 \leq B \leq 100$ or $750 < B < 10,000$,
$B \geq A+C$,
and, when A+C=0, $10 \leq B \leq 100$ or $750 < B < 10,000$.

2. The process of claim 1, wherein the organosiloxane is reacted with silica at temperatures of more than 200° C.

3. The process of claim 2, wherein the organosiloxane contains at least one terminal silanol group.

4. The process of claim 3, wherein the organosiloxane contains more than 80 mol % of $R^1_2SiO_{2/2}$ units.

5. The process of claim 2, wherein the organosiloxane contains at least one terminal trimethylsiloxy group.

6. The process of claim 2, wherein the organosiloxane contains more than 80 mol % of $R^1_2SiO_{2/2}$ units.

7. A silica which has a homogeneous layer of silylating agent on the silica surface, hydrophobic properties, an average primary particle size of less than 100 nm, said primary particles constituting aggregates having a diameter of from 100 to 1000 nm, and agglomerates which have sizes of from 1 to 500 μm, said silica having a specific surface area of from 10 to 300 m²/g, a fractal mass dimension $D_m$ of less than or equal to 2.8, and a carbon content of at least 1.0% by weight, said silica prepared by the process of claim 2.

8. The process of claim 1, wherein the organosiloxane contains at least one terminal silanol group.

9. The process of claim 8, wherein the organosiloxane contains more than 80 mol % of $R^1_2SiO_{2/2}$ units.

10. The process of claim 1, wherein the organosiloxane contains at least one terminal trimethylsiloxy group.

11. The process of claim 1, wherein the organosiloxane contains more than 80 mol % of $R^1_2SiO_{2/2}$ units.

12. A silica which has a homogeneous layer of silylating agent on the silica surface, hydrophobic properties, an average primary particle size of less than 100 nm, said primary particles constituting aggregates having a diameter of from 100 to 1000 nm, and agglomerates which have sizes of from 1 to 500 μm, said silica having a specific surface area of from 10 to 300 m²/g, a fractal mass dimension $D_m$ of less than or equal to 2.8, and a carbon content of at least 1.0% by weight, said silica prepared by the process of claim 1.

13. An additive for controlling the rheology of liquid and pulverulent systems, said additive comprising the silica of claim 12.

14. A filler for reinforcing elastomers, comprising the silica of claim 12.

15. A toner or developer, comprising the silica of claim 12.

16. An additive for controlling the rheology of liquid and pulverulent systems, said additive comprising the silica prepared by the process of claim 1.

17. A filler for reinforcing elastomers, comprising the silica prepared by the process of claim 1.

18. A toner or developer, comprising the silica prepared by the process of claim 1.

19. The process of claim 1, wherein $10 \leq B \leq 20$.

20. The process of claim 19 wherein $B > (2(A+C))$.

21. A process for preparing silylated silica particles, comprising silylating silica particles with an organosiloxane composed of A units of the formula (I)

$(R^1_3SiO_{1/2})$ (I)

and B units of the formulae (IIa–c)

$(R^1_2SiO_{2/2})$, and/or (IIa)

$(R^1SiO_{3/2})$, and/or (IIb)

$(SiO_{4/2})$ (IIc), said organosiloxane optionally bearing 1 or 2 attached groups X bonded to Si atoms where X is OR, halogen, or acetoxy, where R is H or a monovalent $C_{1-4}$ alkyl radical,
$R^1$ is identical or different a saturated or unsaturated, monovalent, or halogenated $C_{1-18}$ hydrocarbon radical,
the number of groups $\equiv SiX$ or $=SiX_2$ present in said organosiloxane defined as C, wherein A, and
B, and C obey the relationships $750 < B < 10,000$,
$B \geq A+C$.

22. A process for preparing silylated silica particles, comprising silylating silica particles with an organosiloxane composed of A units of the formula (I)

$(R^1{}_3SiO_{1/2})$     (I)

and B units of the formulae (IIa–c)

$(R^1{}_2SiO_{2/2})$, and/or     (IIa)

$(R^1SiO_{3/2})$, and/or     (IIb)

$(SiO_{4/2})$     (IIc)

said organosiloxane optionally bearing 1 or 2 attached groups X bonded to Si atoms where X is OR, halogen, or acetoxy, where R is H or a monovalent $C_{1-4}$ alkyl radical, $R^1$ is identical or different a saturated or unsaturated, monovalent, or halogenated $C_{1-18}$ hydrocarbon radical, the number of groups $\equiv SiX$ or $=SiX_2$ present in said organosiloxane defined as C, wherein A, B, and C obey the relationships $1 \leq B \leq 100$ or $750 < B < 10,000$, $B \geq A+C$, and, when A+C=0, $10 \leq B \leq 100$ or $750 < B < 10,000$, and wherein at least one B unit selected from the group consisting of (IIb) and (IIc) is present.

\* \* \* \* \*